(12) United States Patent
Belohlav et al.

(10) Patent No.: US 9,157,134 B2
(45) Date of Patent: Oct. 13, 2015

(54) LOW SILVER, LOW NICKEL BRAZING MATERIAL

(75) Inventors: Alan Belohlav, Belgium, WI (US); Marcin Kuta, Greendale, WI (US)

(73) Assignee: Lucas-Milhaupt, Inc., Cudahy, WI (US)

( * ) Notice: Subject to any disclaimer, the term of this patent is extended or adjusted under 35 U.S.C. 154(b) by 666 days.

(21) Appl. No.: 13/503,551

(22) PCT Filed: Oct. 21, 2010

(86) PCT No.: PCT/US2010/053561
§ 371 (c)(1),
(2), (4) Date: Apr. 23, 2012

(87) PCT Pub. No.: WO2011/053506
PCT Pub. Date: May 5, 2011

(65) Prior Publication Data
US 2012/0207643 A1    Aug. 16, 2012

Related U.S. Application Data

(60) Provisional application No. 61/254,864, filed on Oct. 26, 2009.

(51) Int. Cl.
*C22C 30/02*    (2006.01)
*C22C 5/06*    (2006.01)
(Continued)

(52) U.S. Cl.
CPC .............. *C22C 5/06* (2013.01); *B23K 35/025* (2013.01); *B23K 35/0227* (2013.01);
(Continued)

(58) Field of Classification Search
CPC ........... B23K 35/0227; B23K 35/0244; B23K 35/025

USPC .................................. 420/481, 587
See application file for complete search history.

(56) References Cited

U.S. PATENT DOCUMENTS 400,669 A    4/1889    Norton et al.
607,504 A    7/1898    Crowther
(Continued)

FOREIGN PATENT DOCUMENTS

CA    1303605    6/1992
DE    1298967    7/1969
(Continued)

OTHER PUBLICATIONS

International Search Report for PCT/US2010153561, Dated Dec. 28, 2010.
(Continued)

*Primary Examiner* — Jie Yang
(74) *Attorney, Agent, or Firm* — Boyle Fredrickson, S.C.

(57) ABSTRACT

A homogenous brazing material essentially consisting of relatively low amounts of silver and nickel together with copper, zinc, and other constituents is provided. The brazing material has a working temperature exceeding 630° F. and is preferably between about 1250° F. and 1500° F. The brazing material preferably has about 30 percent by weight of silver, about 36 percent by weight of copper, about 32 percent by weight of zinc, and about 2 percent by weight of nickel. The addition of nickel in the above-specified amount improves resistance against interface corrosion in aqueous solutions, aids in the strength of the alloy, and provides improved wettability on ferrous and non-ferrous substrates. The brazing material may also include a flux, such as a core or a coating.

19 Claims, 2 Drawing Sheets

(51) Int. Cl.

| | | |
|---|---|---|
| *B23K 35/02* | (2006.01) | |
| *B23K 35/24* | (2006.01) | |
| *B23K 35/26* | (2006.01) | |
| *B23K 35/28* | (2006.01) | |
| *B23K 35/30* | (2006.01) | |
| *C22C 9/00* | (2006.01) | |
| *C22C 18/00* | (2006.01) | |
| *C22C 30/06* | (2006.01) | |

(52) U.S. Cl.
CPC ........ *B23K 35/0244* (2013.01); *B23K 35/0266* (2013.01); *B23K 35/24* (2013.01); *B23K 35/26* (2013.01); *B23K 35/282* (2013.01); *B23K 35/302* (2013.01); *B23K 35/3006* (2013.01); *C22C 9/00* (2013.01); *C22C 18/00* (2013.01); *C22C 30/02* (2013.01); *C22C 30/06* (2013.01)

(56) References Cited

U.S. PATENT DOCUMENTS

| | | |
|---|---|---|
| 1,629,748 A | 5/1927 | Stoody |
| 1,650,905 A | 11/1927 | Mills |
| 1,968,618 A | 2/1932 | Padgett et al. |
| 1,865,169 A | 6/1932 | Candy |
| 2,005,189 A | 6/1935 | Herr |
| 2,055,276 A | 9/1936 | Browndson et al. |
| 2,279,284 A | 4/1942 | Wassermann |
| 2,442,087 A | 5/1948 | Kennedy |
| 2,465,503 A | 3/1949 | Woods |
| 2,499,641 A | 3/1950 | Goody |
| 2,565,477 A | 8/1951 | Crowell et al. |
| 2,785,285 A | 3/1957 | Bernard |
| 2,927,043 A | 3/1960 | Stetson |
| 2,958,941 A | 11/1960 | Goerg, Sr. |
| 3,033,713 A | 5/1962 | Bielenberg et al. |
| 3,051,822 A | 8/1962 | Bernard et al. |
| 3,077,131 A | 2/1963 | McShane |
| 3,162,551 A | 12/1964 | Short |
| 3,198,560 A | 8/1965 | Collins |
| 3,239,125 A | 3/1966 | Sherlock |
| 3,245,141 A | 4/1966 | Gruetjen |
| 3,290,772 A | 12/1966 | Crouch |
| 3,318,729 A | 5/1967 | Siegle et al. |
| 3,365,565 A | 1/1968 | Claussen |
| 3,383,197 A | 5/1968 | Albers et al. |
| 3,452,419 A | 7/1969 | Hillert |
| 3,534,390 A | 10/1970 | Woods |
| 3,542,998 A | 11/1970 | Huff |
| 3,555,240 A | 1/1971 | Gloor |
| 3,558,851 A | 1/1971 | Cku |
| 3,610,663 A | 10/1971 | Lago |
| 3,619,429 A | 11/1971 | Torigai et al. |
| 3,620,830 A | 11/1971 | Kramer |
| 3,620,869 A | 11/1971 | Stump et al. |
| 3,639,721 A | 2/1972 | Hubbel |
| 3,642,998 A | 2/1972 | Jennings |
| 3,688,967 A | 9/1972 | Arikawa |
| 3,695,795 A | 10/1972 | Jossick |
| 3,702,254 A | 11/1972 | Maierson et al. |
| 3,745,644 A | 7/1973 | Moyer et al. |
| 3,935,414 A | 1/1976 | Ballass et al. |
| 3,967,036 A | 6/1976 | Sadowski |
| 3,980,859 A | 9/1976 | Leonard |
| 4,041,274 A | 8/1977 | Sadowski |
| 4,049,434 A * | 9/1977 | Sloboda et al. ............... 420/482 |
| 4,121,750 A | 10/1978 | Schoer et al. |
| 4,134,196 A | 1/1979 | Yamaji |
| 4,174,962 A | 11/1979 | Frantzreb |
| 4,214,145 A | 7/1980 | Zvanut |
| 4,301,211 A | 11/1981 | Sloboda |
| 4,379,811 A | 4/1983 | Puschner et al. |
| 4,396,822 A | 8/1983 | Kishida et al. |
| 4,430,122 A | 2/1984 | Pauga |
| 4,447,472 A | 5/1984 | Minnick et al. |
| 4,493,738 A | 1/1985 | Collier et al. |
| 4,497,849 A | 2/1985 | Hughes et al. |
| 4,571,352 A | 2/1986 | Aoki |
| 4,587,726 A | 5/1986 | Holmgren |
| 4,587,097 A | 6/1986 | Rabinkin et al. |
| 4,624,860 A | 11/1986 | Alber et al. |
| 4,708,897 A | 11/1987 | Douchy |
| 4,762,674 A | 8/1988 | Cheng et al. |
| 4,785,092 A | 11/1988 | Nanba et al. |
| 4,800,131 A | 1/1989 | Marshall et al. |
| 4,831,701 A | 5/1989 | Yutaka |
| 4,900,895 A | 2/1990 | Marshall |
| 4,901,909 A | 2/1990 | George |
| 4,993,054 A | 2/1991 | Ujari |
| 5,098,010 A | 3/1992 | Carmichael et al. |
| 5,175,411 A | 12/1992 | Barber |
| 5,184,767 A | 2/1993 | Estes |
| 5,219,425 A | 6/1993 | Nishikawa et al. |
| 5,280,971 A | 1/1994 | Tokutake et al. |
| 5,316,206 A | 5/1994 | Syslak et al. |
| 5,360,158 A | 11/1994 | Conn et al. |
| 5,418,072 A | 5/1995 | Baldantoni et al. |
| 5,575,933 A | 11/1996 | Ni |
| 5,749,971 A | 5/1998 | Ni |
| 5,759,707 A | 6/1998 | Belt et al. |
| 5,781,846 A | 7/1998 | Jossick |
| 5,791,005 A | 8/1998 | Grabowski et al. |
| 5,806,752 A | 9/1998 | Van Evans et al. |
| 5,820,939 A | 10/1998 | Popoola et al. |
| 5,903,814 A | 5/1999 | Miura et al. |
| 6,093,761 A | 7/2000 | Schofalvi |
| 6,204,316 B1 | 3/2001 | Schofalvi |
| 6,244,397 B1 | 6/2001 | Kars |
| 6,248,860 B1 | 6/2001 | Sant'Angelo et al. |
| 6,264,062 B1 | 7/2001 | Lack et al. |
| 6,277,210 B1 | 8/2001 | Schuster |
| 6,317,913 B1 | 11/2001 | Kilmer et al. |
| 6,344,237 B1 | 2/2002 | Kilmer et al. |
| 6,376,585 B1 | 4/2002 | Schofalvi et al. |
| 6,395,223 B1 | 5/2002 | Schuster et al. |
| 6,409,074 B1 | 6/2002 | Katoh et al. |
| 6,417,489 B1 | 7/2002 | Blankenship et al. |
| 6,426,483 B1 | 7/2002 | Blankenship et al. |
| 6,432,221 B1 | 8/2002 | Seseke-Koyro et al. |
| 6,497,770 B2 | 12/2002 | Watsuji et al. |
| 6,608,286 B2 | 8/2003 | Jiang |
| 6,680,359 B2 | 1/2004 | Schoenheider |
| 6,713,593 B2 | 3/2004 | Ree et al. |
| 6,733,598 B2 | 5/2004 | Swidersky et al. |
| 6,830,632 B1 | 12/2004 | Fuerstenau et al. |
| 6,846,862 B2 | 1/2005 | Schofalvi et al. |
| 6,864,346 B2 | 3/2005 | Schoenheider |
| 6,881,278 B2 | 4/2005 | Amita et al. |
| 6,960,260 B2 | 11/2005 | Goto |
| 7,267,187 B2 | 9/2007 | Kembaiyan |
| 7,337,941 B2 | 3/2008 | Scott et al. |
| 7,442,877 B2 | 10/2008 | Kamata et al. |
| 7,858,204 B2 | 12/2010 | Campbell et al. |
| 2002/0106528 A1 | 8/2002 | Jin et al. |
| 2003/0203137 A1 | 10/2003 | Teshima et al. |
| 2004/0009358 A1 | 1/2004 | Scott et al. |
| 2004/0171721 A1 | 9/2004 | Esemplare |
| 2005/0008771 A1 | 1/2005 | Goto |
| 2005/0089440 A1 | 4/2005 | Kembaiyan |
| 2005/0129855 A1 | 6/2005 | Kamata et al. |
| 2007/0093574 A1 | 4/2007 | Esemplare |
| 2007/0251602 A1 | 11/2007 | Gagnon, Jr. et al. |

FOREIGN PATENT DOCUMENTS

| | | |
|---|---|---|
| DE | 8910519 | 10/1989 |
| FR | 7812456 | 11/1977 |
| FR | 2349392 | 11/1997 |
| GB | 692710 | 6/1953 |
| GB | 1180735 | 2/1970 |

(56) References Cited

FOREIGN PATENT DOCUMENTS

| | | |
|---|---|---|
| GB | 1481140 | 7/1977 |
| JP | 58000375 | 1/1983 |
| JP | 62034698 | 2/1987 |
| JP | 63040697 | 2/1988 |
| JP | 63303694 | 12/1988 |
| JP | 01066093 | 3/1989 |
| JP | 2179384 | 7/1990 |
| JP | 3005094 | 1/1991 |
| JP | 3204169 | 9/1991 |
| JP | 4371392 | 12/1992 |
| JP | 6007987 | 1/1994 |
| JP | 11347783 | 12/1999 |
| WO | WO 99/00444 | 7/1999 |
| WO | WO 00/39172 | 7/2000 |
| WO | WO 00/52228 | 9/2000 |
| WO | WO 00/64626 | 11/2000 |
| WO | WO 02/00569 | 1/2002 |
| WO | WO 02/31023 | 4/2002 |
| WO | WO 03/068447 | 8/2003 |
| WO | WO 03/089176 | 10/2003 |
| WO | WO 2004/061871 | 7/2004 |
| WO | WO 2004/094328 | 11/2004 |

OTHER PUBLICATIONS

International Search Report PCT/US06/043856; Sep. 25, 2007.
Written Opinion of the ISA PCT/US06/043856; Sep. 25, 2007.
International Prelim Report on Patentability PCT/US06/043856; May 14, 2008.
International Search Report PCT/US08/064871; Sep. 24, 2008.
Written Opinion of the ISA PCT/US08/064871; Sep. 24, 2008.
International Prelim Report on Patentability PCT/US08/064871; Dec. 1, 2009.
International Search Report PCT/US07/025309; Jul. 21, 2008.
Written Opinion of the ISA PCT/US07/025309; Jul. 21, 2008.
International Prelim Report on Patentability PCT/US07/025309; Jun. 10, 2009.
International Search Report PCT/US07/069636; Nov. 8, 2007.
Written Opinion of the ISA PCT/US07/069636; Nov. 8, 2007.
International Prelim Report on Patentability PCT/US07/069636; Nov. 28, 2008.
European Search Report for EP06837365.3 entered EP from PCT/US2006043856; Jun. 22, 2012.
Belohlav, "Understanding Brazing Fundamentals," The American Welder, Sep.-Oct. 2000.

* cited by examiner

LOW SILVER, LOW NICKEL BRAZING MATERIAL

CROSS-REFERENCES TO RELATED APPLICATIONS

This application claims a benefit of priority under 35 USC §119 based on PCT No. PCT/US2010/053561, filed Oct. 21, 2010, the entire contents of which are hereby expressly incorporated by reference into the present application. This application also claims priority to provisional application No. 61\254,864 filed on Oct. 26, 2009. This application also expressly incorporates by reference the entire contents of U.S. patent application Ser. Nos. 12/602,035 and 11/753,045.

BACKGROUND OF THE INVENTION

1. Field of the Invention

This invention relates generally to brazing material and, more particularly, to a low silver, low nickel brazing materials.

2. Related Art

As is known to those skilled in the art, brazing is a joining process whereby a filler metal is heated to a melting temperature which is lower than the melting temperature of the base metal and distributed between two or more close-fitting parts. The molten filler metal interacts with the base metal and then cools to form a strong, sealed joint. A wide variety of filler metals and alloys may be used. In some cases, flux, in addition to the filler metal, is used.

Brazing with silver-based filler metals has commonly been used as an alternative to bronze brazing because silver brazing does not suffer from the disadvantages that prior forms of bronze brazing have, such as, for example, the left-behind residue and oxide layer formation on the base metal which is heavy, aesthetically displeasing, and difficult to remove. Brazing with silver-based filler metal, however, is disadvantageous in that the silver alloys are costly.

Thus, there is a desire for a brazing material that provides the benefits of silver-based fillers but that generally avoids the costs typically associated with such silver based fillers.

BRIEF SUMMARY OF THE INVENTION

Consistent with the foregoing and in accordance with the invention as embodied and broadly described herein, a brazing material consisting essentially of silver, copper, zinc, and nickel is provided. In one embodiment, the brazing material includes silver, copper, zinc, and nickel in a homogenous cast form, flux cored form, powder, paste, and/or flux coated form.

One object of the invention is to provide a brazing material with a lower silver content, e.g., approximately 20-60%, and nickel content, e.g., approximately 1-5%, in a homogenous form to provide improved braze joint strength and corrosion resistance.

Another object of the invention is to provide a brazing material capable of taking on different forms, such as a strip, wire, ring, washer, powder, paste and other types of performs. Such performs may be coated or cored with an anti-oxide agent, e.g., a flux.

Yet another object is to provide a brazing material that is economical and easy to fabricate and use.

Another object of the present invention is to provide a brazing material that may be configured for use in different applications. For example, the present invention may be used with torch, induction, furnace, or other heating methods that are performed in open air and require the use of a flux and/or controlled atmosphere without the use of flux.

These aspects are merely illustrative of the innumerable aspects associated with the present invention and should not be deemed as limiting in any manner. These and other aspects, features, and advantages of the present invention will become apparent from the following detailed description when taken in conjunction with the drawings.

BRIEF DESCRIPTION OF THE DRAWINGS

Preferred exemplary embodiments of the invention are illustrated in the accompanying drawing in which like reference numerals represent like parts throughout, and in which.

DETAILED DESCRIPTION OF THE INVENTION

The inventors have discovered an alloy suitable for brazing and having a low silver and low nickel content. In one embodiment, the alloy has the following by weight approximate percentages:

| | |
|---|---|
| a. Silver | 20.0%-60.0% |
| b. Copper | 20.0%-60.0% |
| c. Zinc | 31.0%-40.0% |
| d. Nickel | 0.5%-5.00% |
| e. Trace Elements | 0.15% Maximum |

The "trace elements" typically include elements that are picked up during casting of the alloy or other downstream operations during alloy fabrication, such as rolling, drawing, and the like. The trace elements could include cadmium, tin, manganese, lead, and aluminum, as well as others.

The melting range of the alloy is preferably between approximately 1250° F. and approximately 1450° F. (677° C.-788° C.). The nickel content of the alloy improves wettability of the filler metal on ferrous and non-ferrous substrates. The addition of nickel in the alloy also improves resistance against interface corrosion in aqueous solutions and makes the alloy particularly well-suited for brazing steels and stainless steel alloys. The presence of nickel also aids in alloy strength. The brazing material may further include a flux, e.g., as a core or coating. The flux preferably has an active temperature substantially lower than that of the liquidus point of the brazing material.

The brazing material may be delivered in a variety of different forms such as flux cored round wires, oval wires, round rods, oval rods, round rings, oval rings, round specialty preforms, oval specialty preform, or homogonous cast solid wires, rings, strips, washers and other such pre-forms, paste, and powder. Additionally, the brazing material described herein provides improved free-flowing characteristics when compared to known non-cadmium low silver content based alloys. It will also be appreciated that a zinc constituent of between 31 and 40% by weight advantageously provides for a lower melting temperature and improves flow. Further, as cadmium is a known carcinogen, the present invention uses a significantly lower amount of cadmium than other known alloys and therefore is compliant with governmental regulations regarding the use and handling of potentially hazardous materials. In addition to improved flow characteristics, the inventors have also found that the present invention advantageously provides an alloy with corrosion characteristics similar to those of more costly high silver content alloys.

Figure 1:
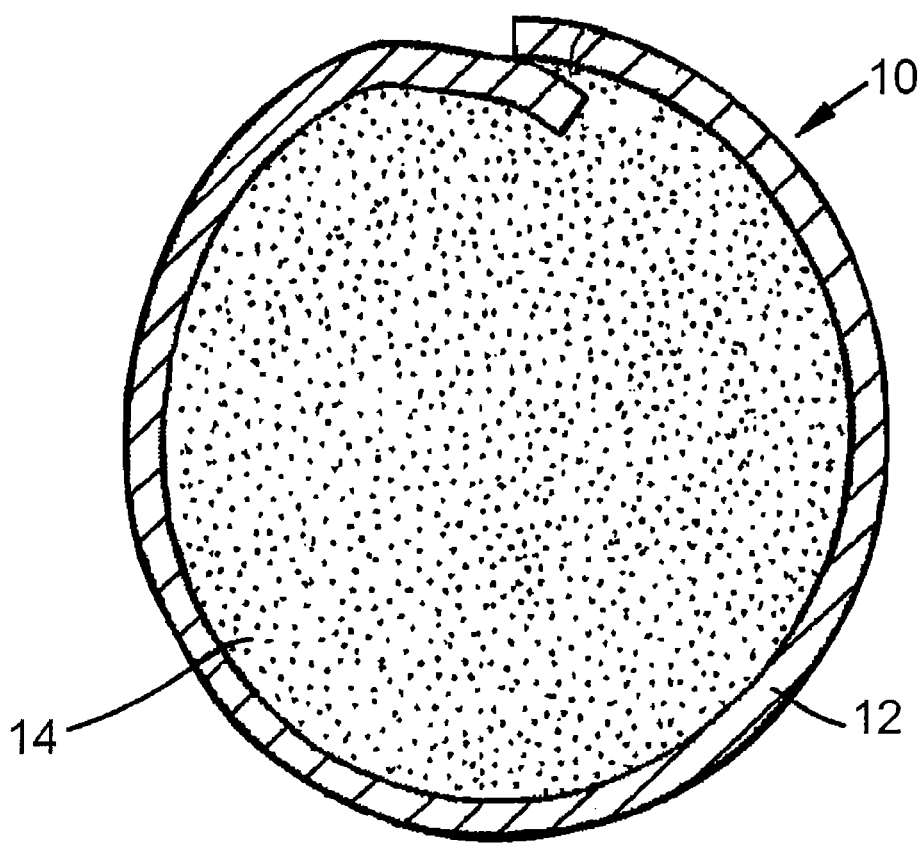
FIG. 1 illustrates a cross-sectional view of a round-shaped flux cored wire feed having an alloy casing according to one aspect of the invention.

FIG. 1 illustrates one exemplary form in which the alloy of the present invention may be embodied. A circular flux cored wire feed 10 is shown in FIG. 1. Although a wire loop is shown, any shape may be used. The flux wire 10 includes a rolled metal alloy sheet 12 having a composition similar to that described above and that defines a casing for flux material 14. The flux used in the core is preferably a low temperature, water-soluble, proprietary post-braze flux, such as HANDY FLUX braze offered by Lucas-Milhaupt.

Figure 2:
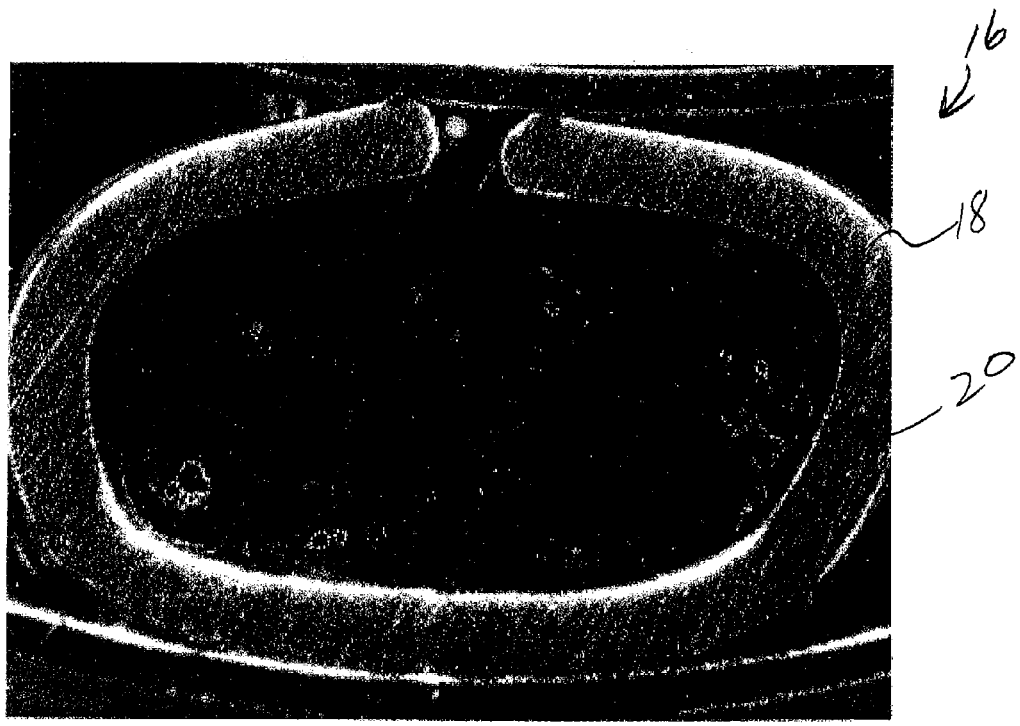
FIG. 2 illustrates a cross-sectional view of an oval-shaped flux cored wire feed having an alloy casing according to one aspect of the invention.

FIG. 2 illustrates another exemplary form in which the present invention may be embodied. More particularly, the figure shows flux cored ring 16 having an oval cross section. The ring has rolled metal alloy sheet 18 having a composition similar to that described herein and defines a casing for flux material 20. The flux used in the core is preferably a low temperature, water-soluble, proprietary post-braze flux, such as HANDY FLUX braze offered by Lucas-Milhaupt. In one preferred implementation, ring 16 is 0.053 inches wide and 0.092 inches thick; although, rings with other dimensions are possible.

The inventors have found that the present alloy of the present invention provides a braze capable of providing high strength joints. For example, the braze of the present invention, when used with low carbon steel, was found to provide joints having a tensile strength between 55,000 p.s.i.-71,900 p.s.i. The table below provides summarizes Ultimate Tensile Strength and elongation characteristics of one embodiment of the braze of the present invention.

TABLE 1

| | Diameter (in) | Ultimate Tensile Strength (psi) | Yield Stress (psi) | Elong. (%) | Young's Modulus (Auto) (psi) | Maximum Load (lbf) | Yield Load (lbf) | Break Load (Auto) (lbf) | Break Disp (Auto) (in) |
|---|---|---|---|---|---|---|---|---|---|
| 1 | 0.125 | 99251.227 | 41206.961 | 7.154 | 6263201.00 | 1217.996 | 505.686 | 849.092 | 0.143 |
| 2 | 0.125 | 99626.852 | 51780.965 | 6.334 | 6708642.50 | 1222.605 | 635.448 | 865.360 | 0.127 |
| Mean | 0.125 | 99439.039 | 46493.961 | 6.744 | 6485922.00 | 1220.301 | 570.567 | 857.226 | 0.135 |
| S.D. | 0.000 | 265.607 | 7476.950 | 0.580 | 314974.719 | 3.259 | 91.756 | 11.503 | 0.012 |
| Minimum | 0.125 | 99251.227 | 41206.961 | 6.334 | 6263201.00 | 1217.996 | 505.686 | 849.092 | 0.127 |
| Maximum | 0.125 | 99626.852 | 51780.965 | 7.154 | 6708642.50 | 1222.605 | 635.448 | 865.360 | 0.143 |

It will be appreciated that the inventive alloy may be used with a number of different known brazing and to-be-developed brazing techniques. One exemplary brazing technique is described in U.S. Ser. No. 12/523,112, the disclosure of which is incorporated herein. Additionally, the invention provides a braze that is ductile, conductive, provides generally leak tight joints, user-friendly, and forgiving. Joints formed with the braze of the invention are also believed to be visually pleasing.

While preferred examples of the present invention have been illustrated and described, this has been by way of illustration only, and the invention should not be limited except as required by the scope of the appended claims and their equivalents.

Many changes and modifications could be made to the invention without departing from the spirit thereof. The scope of these changes will become apparent from the appended claims.

We claim:

1. A brazing material consisting of:
   less than approximately 35 percent by weight of silver;
   less than approximately 40 percent by weight of copper;
   more than 18 percent by weight of zinc;
   from approximately 1.75 percent by weight to approximately 2.25 percent by weight of nickel; and wherein the brazing material has a working temperature greater than approximately 630° F.

2. The material of claim 1 having silver in an amount less than 32 percent by weight of silver.

3. The material of claim 2 having silver in an amount less than 31 percent by weight of silver.

4. The material of claim 3 having from approximately 29 percent by weight to approximately 31 percent by weight of silver.

5. The material of claim 1 having from approximately 31 percent by weight to approximately 40 percent by weight of zinc.

6. The material of claim 1 having copper in an amount less than 38 percent by weight.

7. The material of claim 6 having copper in an amount less than approximately 37 percent by weight.

8. The material of claim 7 having from approximately 35 percent by weight to approximately 37 percent by weight of copper.

9. The material of claim 1 having a working temperature of between 1250° F. and 1450° F.

10. The material of claim 1 in the form of at least one of a strip, a wire, a ring, a washer, a powder, and a paste.

11. The material of claim 1 configured for at least one of:
    use with torch, induction, furnace or other heating methods that are performed in open air and require the use of a flux; and
    controlled atmosphere heating without the use of a flux.

12. The material of claim 1 having less than 0.20 percent by weight of indium, gallium, tin, aluminum, and titanium.

13. A brazing material consisting of:
    copper;
    zinc;
    nickel;
    silver;
    less than six percent by weight of cadmium;
    trace constituents amounting to no more than 0.15 percent by weight of the total material composition; and
    the brazing material having a working temperature exceeding 630° F.

14. The material of claim 13 having from approximately 29 percent by weight to approximately 31 percent by weight of silver.

15. The material of claim 13 having from approximately 1.75 percent by weight to approximately 2.25 percent by weight of nickel.

16. The material of claim 13 having from approximately 31 percent by weight to approximately 33 percent by weight of zinc.

17. The material of claim 13 having from approximately 35 percent by weight to approximately 37 percent by weight of copper.

18. The material of claim 13 having a working temperature between approximately 1250° F. to approximately 1450° F.

19. A brazing material having a total composition consisting of:

from approximately 20 percent by weight to approximately 60 percent by weight of silver;
from approximately 20 percent by weight to approximately 60 percent by weight of copper;
from approximately 31 percent to approximately 40 percent by weigh of zinc;
from approximately 0.5 percent by weight to approximately 5.00 percent by weight of nickel;
trace elements amounting to no more than approximately 0.15 percent by weight of the total composition; and wherein
the brazing material has a working temperature greater than approximately 630° F.

* * * * *